Patented Apr. 17, 1951

2,549,549

UNITED STATES PATENT OFFICE 2,549,549

PROCESS FOR PRODUCING ALUMINUM TRIHYDRATE

James R. Wall, Collinsville, Ill., assignor to Aluminum Company of America, Pittsburgh, Pa., a corporation of Pennsylvania No Drawing. Application June 7, 1947, Serial No. 753,371

2 Claims. (Cl. 23—143)

This invention relates to the production of aluminum trihydrate, and relates particularly to a process for producing aluminum trihydrate by auto-precipitation from an alkali metal aluminate solution.

As is well known, crystalline aluminum trihydrate can be precipitated from alkali metal aluminate solutions by auto-precipitation. That is the procedure used in the Bayer process and its various modifications, in which a sodium aluminate solution which is supersaturated with respect to aluminum trihydrate is "seeded" with crystalline aluminum trihydrate precipitated previously. For many years it has been customary to obtain the seed by separating the finer particles from aluminum trihydrate produced by auto-precipitation, as described in United States Patent No. 1,314,710 to Sherwin. Ordinarily, the amount of seed employed is in the neighborhood of the amount of precipitate to be produced from the solution, and the product obtained is in the form of particles which are unduly large for various applications in which aluminum trihydrate is otherwise useful, for example, as a filler in the compounding of rubber, and as a pigment.

The present invention provides a procedure for auto-precipitation of crystalline aluminum trihydrate from such solutions, in which "seed" particles of crystalline aluminum trihydrate mingled with amorphous aluminum hydroxide are employed, and which is particularly adapted to the production of crystalline aluminum trihydrate in the form of extremely fine particles. In accordance with the invention, the seed particles are produced by precipitating gelatinous, amorphous aluminum hydroxide from a solution of an aluminum salt, and the precipitate is then allowed to stand or "age" in contact with an aqueous solution of an alkali metal carbonate or alkali metal hydroxide, or both. In this ageing step, part of the amorphous aluminum hydroxide is converted to very fine particles of crystalline aluminum trihydrate, which thereafter serve as seed or nuclei in the auto-precipitation of crystalline aluminum trihydrate from an alkali metal aluminate solution, such as a sodium- or potassium aluminate solution.

When the mixture of amorphous aluminum hydroxide and crystalline aluminum trihydrate produced as described above is added to the alkali metal aluminate solution from which aluminum trihydrate is to be precipitated, the amorphous material dissolves away from the very fine particles of crystalline aluminum trihydrate, leaving those particles dispersed in the solution to act as seed, while the dissolved amorphous aluminum hydroxide supplies additional alumina to the solution.

The amorphous aluminum hydroxide mentioned above can be produced from aqueous solutions of aluminum salts (such as sodium aluminate, aluminum sulphate and aluminum chloride) by well known methods, in which the aluminum hydroxide is precipitated by rapid neutralization of the aluminum salt. In carrying out that procedure in practicing the present invention, it is preferable to use reagents which will produce a solution of the type mentioned above, in which amorphous aluminum hydroxide precipitated can be converted to crystalline aluminum trihydrate. For example, when the amorphous aluminum hydroxide is precipitated by rapidly mixing carbon dioxide gas, carbonic acid, or sodium bicarbonate solution, with an aqueous sodium aluminate solution, a slurry of precipitated amorphous aluminum hydroxide and sodium carbonate solution is obtained.

The size of the particles of the product obtained in the auto-precipitation of crystalline aluminum trihydrate is considerably affected by the size of the seed particles. In general, the finer the seed, the finer the product of the auto-precipitation process under any given set of conditions. The size of the seed obtained by the ageing procedure described above in turn depends to a great extent on the particular conditions of time, temperature, and solution alkalinity employed in partially converting amorphous aluminum hydroxide to aluminum trihydrate. The aluminum trihydrate particles increase in size the longer they remain in the solution, and the higher the temperature of the solution. Likewise, the more alkaline the solution in which the conversion takes place, the larger will be the particles of aluminum trihydrate under the same conditions of time and temperature. In any event, the solution should not be of such a character as to redissolve the amorphous aluminum hydroxide, nor should the temperature employed be sufficiently high for the crystalline aluminum trihydrate formed to be converted to aluminum monohydrate.

Since through control of the conditions in which the conversion to crystalline aluminum trihydrate is effected, the size of the particles of aluminum trihydrate can be controlled, the present invention is particularly adapted to the production of crystalline aluminum trihydrate by auto-precipitation in the form of much smaller particles than those obtained by normal Bayer process operations. That result can be obtained by employing in the auto-precipitation process ultra small particles of crystalline aluminum trihydrate produced as described above from amorphous aluminum hydroxide.

For example, crystalline aluminum trihydrate having an average particle size of less than one micron was produced by first rapidly mixing with a Bayer process sodium aluminate solution (produced by digesting bauxite in a hot sodium hydroxide-sodium carbonate solution) containing 88.1 grams per liter $Al_2O_3$, 98.1 grams per liter NaOH, 74.8 grams per liter $Na_2CO_3$, and water, about twice as much of an aqueous solution containing 100.8 grams per liter of sodium bicarbonate, the mixture being at a temperature of about 100° F. The resultant slurry, containing 39.8 grams per liter of gelatious, amorphous aluminum hydroxide, 1.9 grams per liter of NaOH, and 119.4 grams per liter of $Na_2CO_3$ was gently agitated for 28 hours at 96 to 120° F., by which time part of the amorphous aluminum hydroxide had been converted to crystalline aluminum trihydrate particles having an average size of less than 0.01 micron (as determined by calculation from electron microscope diffraction patterns of the particles). The slurry was then added to a further portion of the same Bayer process sodium aluminate solution mentioned above at 125° F. in the proportions of 1 liter of the slurry to 6.58 liters of the sodium aluminate solution. The mix was agitated by means of an air lift for 12.8 hours while being maintained at about 125 to 132° F., thus auto-precipitating crystalline aluminum trihydrate, which was filtered from the solution and dried. In the above process 14.2 pounds of very finely divided, crystalline aluminum trihydrate were precipitated in the auto-precipitation operation for each pound of the mixture of amorphous aluminum hydroxide and crystalline aluminum trihydrate employed to supply the seed particles.

I claim:
1. The process of producing crystalline aluminum trihydrate from a sodium aluminate solution, comprising the steps of precipitating amorphous aluminum hydroxide from a solution of an aluminum salt, maintaining the said precipitate in undissolved form in contact with a solution of an alkali metal compound selected from the group consisting of the carbonates and hydroxides for sufficient time to convert only part of the said amorphous aluminum hydroxide to crystalline aluminum trihydrate and thus produce a mixture of amorphous aluminum hydroxide and minute particles of crystalline aluminum trihydrate, thereafter adding the said mixture of amorphous aluminum hydroxide and aluminum trihydrate to the said sodium aluminate solution and agitating the resultant mix, whereby aluminum trihydrate is precipitated from the sodium aluminate solution by auto-precipitation.

2. The process of producing crystalline aluminum trihydrate from a sodium aluminate solution, comprising the steps of forming a slurry of amorphous aluminum hydroxide and an alkali metal carbonate solution by mixing together an alkali metal aluminate solution and a material selected from the group composed of sodium bicarbonate, carbonic acid, and carbon dioxide, maintaining the said amorphous aluminum hydroxide in undissolved form in contact with the said alkali metal carbonate solution for sufficient time to convert only part of the aluminum hydroxide to crystalline aluminum trihydrate and thus produce a mixture of amorphous aluminum hydroxide and minute particles of crystalline aluminum trihydrate, thereafter adding the resultant mixture of amorphous aluminum hydroxide and crystalline aluminum trihydrate to a sodium aluminate solution and agitating the resultant mix, whereby crystalline aluminum trihydrate is precipitated from the said sodium aluminate solution by auto-precipitation.

JAMES R. WALL.

REFERENCES CITED

The following references are of record in the file of this patent:

UNITED STATES PATENTS

| Number | Name | Date |
|---|---|---|
| 1,835,271 | Burke et al. | Dec. 8, 1931 |
| 2,247,624 | Wall | July 1, 1941 |
| 2,406,420 | Weiser | Aug. 27, 1946 |